(12) United States Patent
Hiroki

(10) Patent No.: US 8,171,183 B2
(45) Date of Patent: May 1, 2012

(54) INFORMATION PROCESSING APPARATUS AND PROGRAM AND METHOD FOR SETTING IDENTIFICATION INFORMATION

(75) Inventor: Masahide Hiroki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 12/718,957

(22) Filed: Mar. 6, 2010

(65) Prior Publication Data

US 2010/0228882 A1 Sep. 9, 2010

(30) Foreign Application Priority Data

Mar. 6, 2009 (JP) ................................ 2009-052974

(51) Int. Cl.
*G06F 11/22* (2006.01)
(52) U.S. Cl. ....................................................... 710/15
(58) Field of Classification Search ........................ None
See application file for complete search history.

(56) References Cited

U.S. PATENT DOCUMENTS

| | | | | |
|---|---|---|---|---|
| 6,742,059 B1 * | 5/2004 | Todd et al. | ...................... | 710/19 |
| 6,917,626 B1 * | 7/2005 | Duvvury | ...................... | 370/466 |
| 7,216,184 B2 * | 5/2007 | Milner et al. | ...................... | 710/10 |
| 7,363,439 B2 * | 4/2008 | Miyagaki et al. | ............. | 711/154 |
| 7,536,541 B2 * | 5/2009 | Isaacson | ........................... | 713/2 |
| 7,689,736 B2 * | 3/2010 | Kalwitz | ........................... | 710/31 |
| 7,873,783 B2 * | 1/2011 | Takeuchi | ...................... | 711/114 |
| 8,024,494 B2 * | 9/2011 | Soeda et al. | ...................... | 710/15 |
| 2006/0235997 A1 * | 10/2006 | Munirajan et al. | ............ | 709/245 |
| 2008/0281973 A1 * | 11/2008 | Yang | ............................ | 709/228 |

FOREIGN PATENT DOCUMENTS

| | | |
|---|---|---|
| JP | 2002-300736 | 10/2002 |
| WO | WO-2009/69234 | 6/2009 |

* cited by examiner

*Primary Examiner* — Cheng-Yuan Tseng
(74) *Attorney, Agent, or Firm* — Fujitsu Patent Center

(57) ABSTRACT

An information processing apparatus communicates within a system by using identification information for identifying a device includes, a first device in which a first identifier is uniquely set, a holding part that holds a second identifier settable arbitrarily for a device in the system, an acquiring part that acquires identification information corresponding to a second device connected in the system and is different from the first device, a determining part that determines whether the second identifier to be set for the first device is used in the system as the identification information based on the identification information corresponding to the second device acquired by the acquiring part and the second identifier held in the holding part, and a setting part that sets the second identifier as the identification information of the first device based on the determination by that the second identifier is not used in the system.

8 Claims, 21 Drawing Sheets

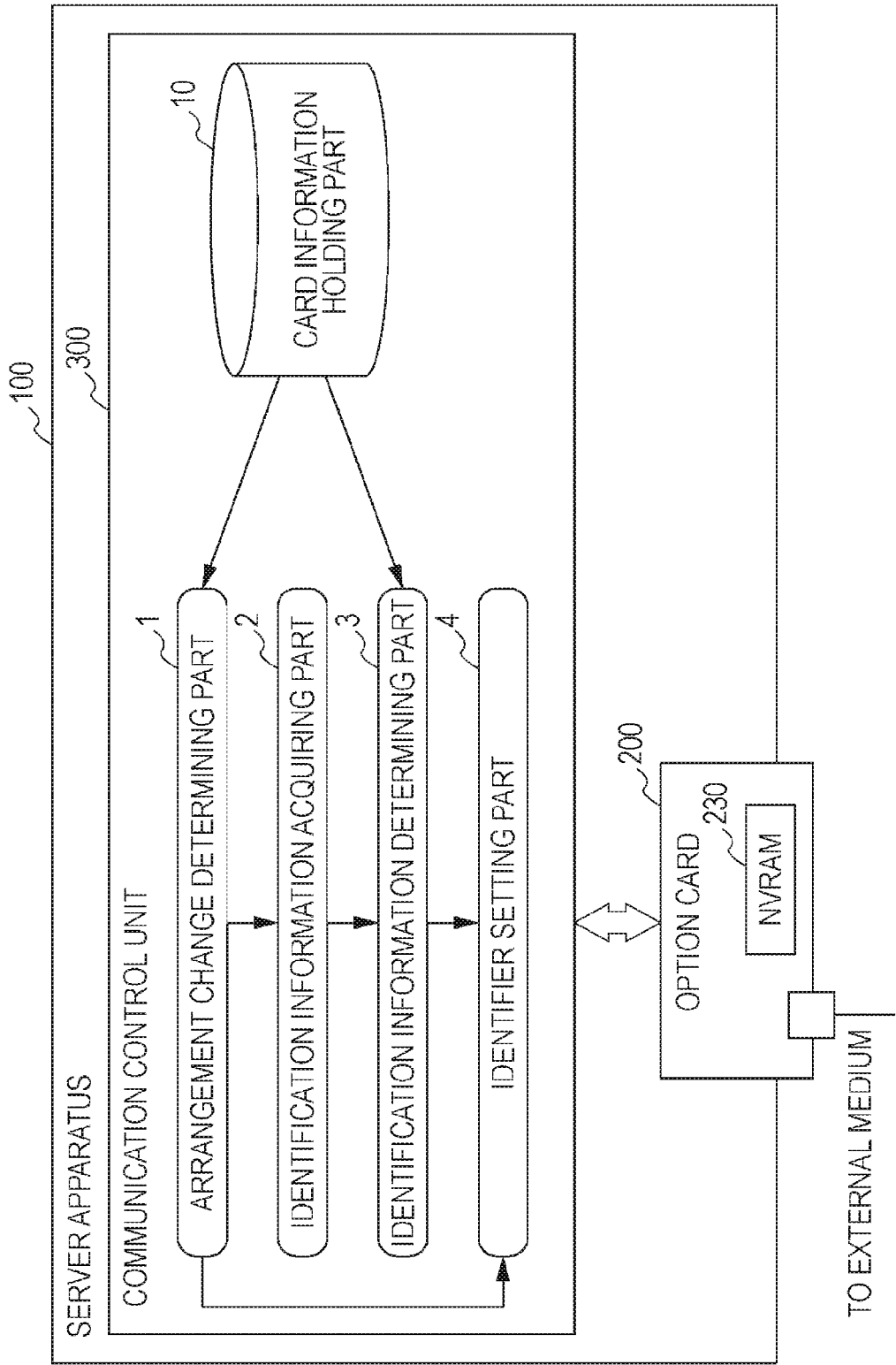

FIG. 4

CARD INFORMATION

| NAME |
| --- |
| CARD SPECIFIC IDENTIFIER (ORIGINAL) |
| CARD SPECIFIC IDENTIFIER (NEW) |
| SERVER SPECIFIC IDENTIFIER $\alpha$ |
| CARD MOUNTING POSITION INFORMATION $\beta$ |

FIG. 7

CARD INFORMATION

| NAME | DESCRIPTION |
|---|---|
| CARD SPECIFIC IDENTIFIER (ORIGINAL) | WWPN (World Wide Port Name) IS USED<br><br>EXAMPLE: A=0x500000000000001A<br>B=0x500000000000001B<br>C=0x500000000000001C<br>D=0x500000000000001D<br>E=0x500000000000001E<br>F=0x500000000000001F |
| CARD SPECIFIC IDENTIFIER (NEW) | EXAMPLE: Z=0x5000000000000010 |
| SERVER SPECIFIC IDENTIFIER $\alpha$ | UNSET WHEN CARD IS NEWLY MOUNTED<br>MAC ADDRESS OF SERVER IS USED<br><br>EXAMPLE: 0x000000000001111 |
| CARD MOUNTING POSITION INFORMATION $\beta$ | UNSET WHEN CARD IS NEWLY MOUNTED<br>PHYSICAL ADDRESS NAME IS USED<br><br>EXAMPLE: pci1,2000/pci@1 |

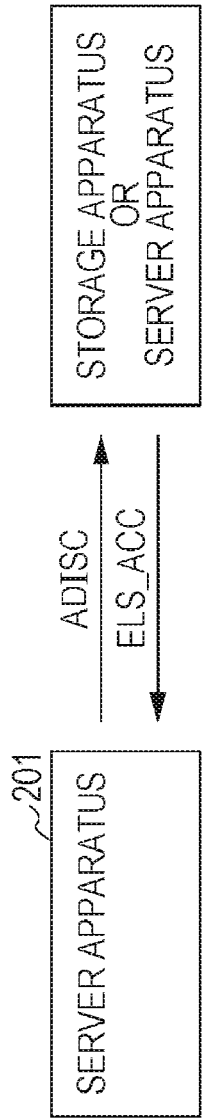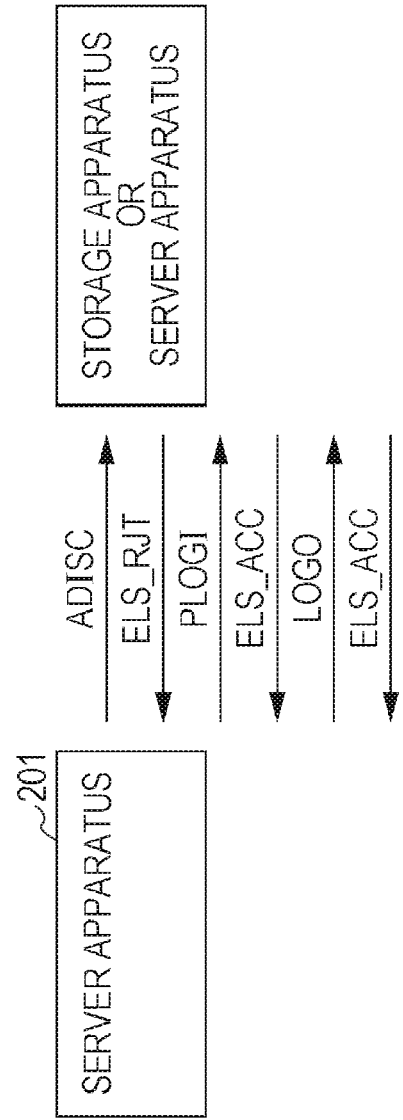

FIG. 9A

FORMAT OF ADISC REQUEST FRAME SENT FROM SERVER

| 31 24 | 23 16 | 15 8 | 7 0 |
|---|---|---|---|
| CMD(0x52) | | | |
| hard address | | | |
| World Wide Port Name [0] ◄— CARD SPECIFIC IDENTIFIER (ORIGINAL) IS STORED [HIGH-ORDER 32 BITS] ||||
| World Wide Port Name [1] ◄— CARD SPECIFIC IDENTIFIER (ORIGINAL) IS STORED [LOW-ORDER 32 BITS] ||||
| World Wide Node Name [0] ||||
| World Wide Node Name [1] ||||

FIG. 9B

FORMAT OF ADISC REPLY FRAME (ELS_ACC) RECEIVED BY SERVER

| 31 24 | 23 16 | 15 8 | 7 0 |
|---|---|---|---|
| CMD(0x02) | | | |
| hard address | | | |
| World Wide Port Name [0] ◄— ADDED TO LIST AS CONNECTED APPARATUS INFORMATION [HIGH-ORDER 32 BITS] ||||
| World Wide Port Name [1] ◄— ADDED TO LIST AS CONNECTED APPARATUS INFORMATION [LOW-ORDER 32 BITS] ||||
| World Wide Node Name [0] ||||
| World Wide Node Name [1] ||||

FIG. 10A

FORMAT OF PLOGI REQUEST FRAME SENT FROM SERVER

| 31 24 | 23 16 | 15 8 | 7 0 |
|---|---|---|---|
| CMD(0x03) | | | |
| version | | BB_credit | |
| common feature | | BB_datasize | |
| total concurrent sequence | | relative offset | |
| E_D_TOV | | | |
| WWPN[0] ← CARD SPECIFIC IDENTIFIER (ORIGINAL) IS STORED [HIGH-ORDER 32 BITS] | | | |
| WWPN[1] ← CARD SPECIFIC IDENTIFIER (ORIGINAL) IS STORED [LOW-ORDER 32 BITS] | | | |
| WWNN[0] | | | |
| WWNN[1] | | | |
| class parameter for class 1 | | | |
| class parameter for class 2 | | | |
| class parameter for class 3 | | | |
| class parameter for class 4 | | | |
| vendor version | | | |

FIG. 10B

FORMAT OF PLOGI REPLY FRAME RECEIVED BY SERVER

| 31 24 | 23 16 | 15 8 | 7 0 |
|---|---|---|---|
| CMD(0x02) | | | |
| version | | BB_credit | |
| common feature | | BB_datasize | |
| total concurrent sequence | | relative offset | |
| E_D_TOV | | | |
| WWPN[0] ← ADDED TO LIST AS CONNECTED APPARATUS INFORMATION [HIGH-ORDER 32 BITS] | | | |
| WWPN[1] ← ADDED TO LIST AS CONNECTED APPARATUS INFORMATION [LOW-ORDER 32 BITS] | | | |
| WWNN[0] | | | |
| WWNN[1] | | | |
| class parameter for class 1 | | | |
| class parameter for class 2 | | | |
| class parameter for class 3 | | | |
| class parameter for class 4 | | | |
| vendor version | | | |

FIG. 11

EXAMPLE OF ACQUIRED SPECIFIC IDENTIFIER INFORMATION LIST

|  | PORT ID | WWPN (SPECIFIC IDENTIFIER INFORMATION) |
|---|---|---|
| 1 | 0xef | 0x500000000000001F |
| 2 | 0xe8 | 0x500000000000001E |
| 3 | 0xe4 | -(APPARATUS DOES NOT EXIST) |
| 4 | 0xe1 | -(APPARATUS DOES NOT EXIST) |
| ... | | |
| ... | | |
| 124 | 0x04 | 0x500000000000001A |
| 125 | 0x02 | 0x500000000000001B |
| 126 | 0x01 | 0x500000000000001C |

FIG. 13

CARD INFORMATION

| NAME | DESCRIPTION |
|---|---|
| CARD SPECIFIC IDENTIFIER (ORIGINAL) | WWN IS USED<br><br>EXAMPLE: A=0x500000000000001A<br>B=0x500000000000001B<br>C=0x500000000000001C<br>D=0x500000000000001D<br>E=0x500000000000001E<br>F=0x500000000000001F |
| CARD SPECIFIC IDENTIFIER (NEW) | EXAMPLE: Z=0x5000000000000002 |
| SERVER SPECIFIC IDENTIFIER $\alpha$ | UNSET WHEN CARD IS NEWLY MOUNTED<br>MAC ADDRESS IS USED<br><br>EXAMPLE: 0x00000000001111 |
| CARD MOUNTING POSITION INFORMATION $\beta$ | UNSET WHEN CARD IS NEWLY MOUNTED<br>PHYSICAL ADDRESS NAME IS USED<br><br>EXAMPLE: pci1,2000/pci@1 |

FIG. 15A

FORMAT OF FLOGI REQUEST FRAME SENT FROM SERVER APPARATUS

| 31 | 24 | 23 | 16 | 15 | 8 | 7 | 0 |
|---|---|---|---|---|---|---|---|
| CMD | | | | | | | |
| version | | | | BB_credit | | | |
| common feature | | | | BB_datasize | | | |
| total concurrent sequence | | | | relative offset | | | |
| E_D_TOV | | | | | | | |
| WWPN[0] ← CARD SPECIFIC IDENTIFIER (ORIGINAL) IS STORED [HIGH-ORDER 32 BITS] | | | | | | | |
| WWPN[1] ← CARD SPECIFIC IDENTIFIER (ORIGINAL) IS STORED [LOW-ORDER 32 BITS] | | | | | | | |
| WWNN[0] | | | | | | | |
| WWNN[1] | | | | | | | |
| class parameter for class 1 | | | | | | | |
| class parameter for class 2 | | | | | | | |
| class parameter for class 3 | | | | | | | |
| class parameter for class 4 | | | | | | | |
| vendor version | | | | | | | |

FIG. 15B

FORMAT OF FLOGI REPLY FRAME RECEIVED BY SERVER APPARATUS

| 31 | 24 | 23 | 16 | 15 | 8 | 7 | 0 |
|---|---|---|---|---|---|---|---|
| ACC | | | | | | | |
| version | | | | BB_credit | | | |
| common feature | | | | BB_datasize | | | |
| total concurrent sequence | | | | relative offset | | | |
| E_D_TOV | | | | | | | |
| WWPN[0] ← ADDED TO LIST AS CONNECTED APPARATUS INFORMATION [HIGH-ORDER 32 BITS] | | | | | | | |
| WWPN[1] ← ADDED TO LIST AS CONNECTED APPARATUS INFORMATION [LOW-ORDER 32 BITS] | | | | | | | |
| WWNN[0] | | | | | | | |
| WWNN[1] | | | | | | | |
| class parameter for class 1 | | | | | | | |
| class parameter for class 2 | | | | | | | |
| class parameter for class 3 | | | | | | | |
| class parameter for class 4 | | | | | | | |
| vendor version | | | | | | | |

FIG. 16A
FORMAT OF PLOGI REQUEST FRAME SENT FROM SERVER APPARATUS

| 31 24 | 23 16 | 15 8 | 7 0 |
|---|---|---|---|
| CMD(0x03) | | | |
| version | | BB_credit | |
| common feature | | BB_datasize | |
| total concurrent sequence | | relative offset | |
| E_D_TOV ||||
| WWPN[0] ← CARD SPECIFIC IDENTIFIER (ORIGINAL) IS STORED [HIGH-ORDER 32 BITS] ||||
| WWPN[1] ← CARD SPECIFIC IDENTIFIER (ORIGINAL) IS STORED [LOW-ORDER 32 BITS] ||||
| WWNN[0] ||||
| WWNN[1] ||||
| class parameter for class 1 ||||
| class parameter for class 2 ||||
| class parameter for class 3 ||||
| class parameter for class 4 ||||
| vendor version ||||

FIG. 16B
FORMAT OF PLOGI REPLY FRAME RECEIVED BY SERVER APPARATUS

| 31 24 | 23 16 | 15 8 | 7 0 |
|---|---|---|---|
| CMD(0x02) | | | |
| version | | BB_credit | |
| common feature | | BB_datasize | |
| total concurrent sequence | | relative offset | |
| E_D_TOV ||||
| WWPN[0] ← ADDED TO LIST AS CONNECTED APPARATUS INFORMATION [HIGH-ORDER 32 BITS] ||||
| WWPN[1] ← ADDED TO LIST AS CONNECTED APPARATUS INFORMATION [LOW-ORDER 32 BITS] ||||
| WWNN[0] ||||
| WWNN[1] ||||
| class parameter for class 1 ||||
| class parameter for class 2 ||||
| class parameter for class 3 ||||
| class parameter for class 4 ||||
| vendor version ||||

FIG. 17A

FORMAT OF GPN_PT REQUEST FRAME SENT FROM SERVER APPARATUS

| 31 24 | 23 16 | 15 8 | 7 0 |
|---|---|---|---|
| revision | IN ID | | |
| GS_type | GS_Subtype | options | reserved |
| command/response code | | max/residual size | |
| Fragment ID | Reason Code | Explanation | vendor unique |
| reserved | domain | area | fc4_type |

FIG. 17B

FORMAT OF GPN_PT REPLY FRAME RECEIVED BY SERVER APPARATUS

| 31 24 | 23 16 | 15 8 | 7 0 |
|---|---|---|---|
| revision | IN ID | | |
| GS_type | GS_Subtype | options | reserved |
| command/response code | | max/residual size | |
| Fragment ID | Reason Code | Explanation | vendor unique |
| control | port ID #1 | | |
| reserved | | | |
| WWPN[0] #1 ←— ADDED TO LIST AS CONNECTED APPARATUS INFORMATION [HIGH-ORDER 32 BITS] | | | |
| WWPN[1] #1 ←— ADDED TO LIST AS CONNECTED APPARATUS INFORMATION [LOW-ORDER 32 BITS] | | | |
| .... | | | |
| control | port ID #N | | |
| reserved | | | |
| WWPN[0] #N ←— ADDED TO LIST AS CONNECTED APPARATUS INFORMATION [HIGH-ORDER 32 BITS] | | | |
| WWPN[1] #N ←— ADDED TO LIST AS CONNECTED APPARATUS INFORMATION [LOW-ORDER 32 BITS] | | | |

FIG. 18

EXAMPLE OF ACQUIRED SPECIFIC IDENTIFIER INFORMATION LIST

|   | PORT ID  | WWPN (SPECIFIC IDENTIFIER INFORMATION) |
|---|----------|----------------------------------------|
| 1 | 0x100100 | 0x500000000000001F                     |
| 2 | 0x100200 | 0x500000000000001E                     |
| 3 | 0x101100 | 0x500000000000001A                     |
| 4 | 0x101200 | 0x500000000000001B                     |
| 5 | 0x101300 | 0x500000000000001C                     |

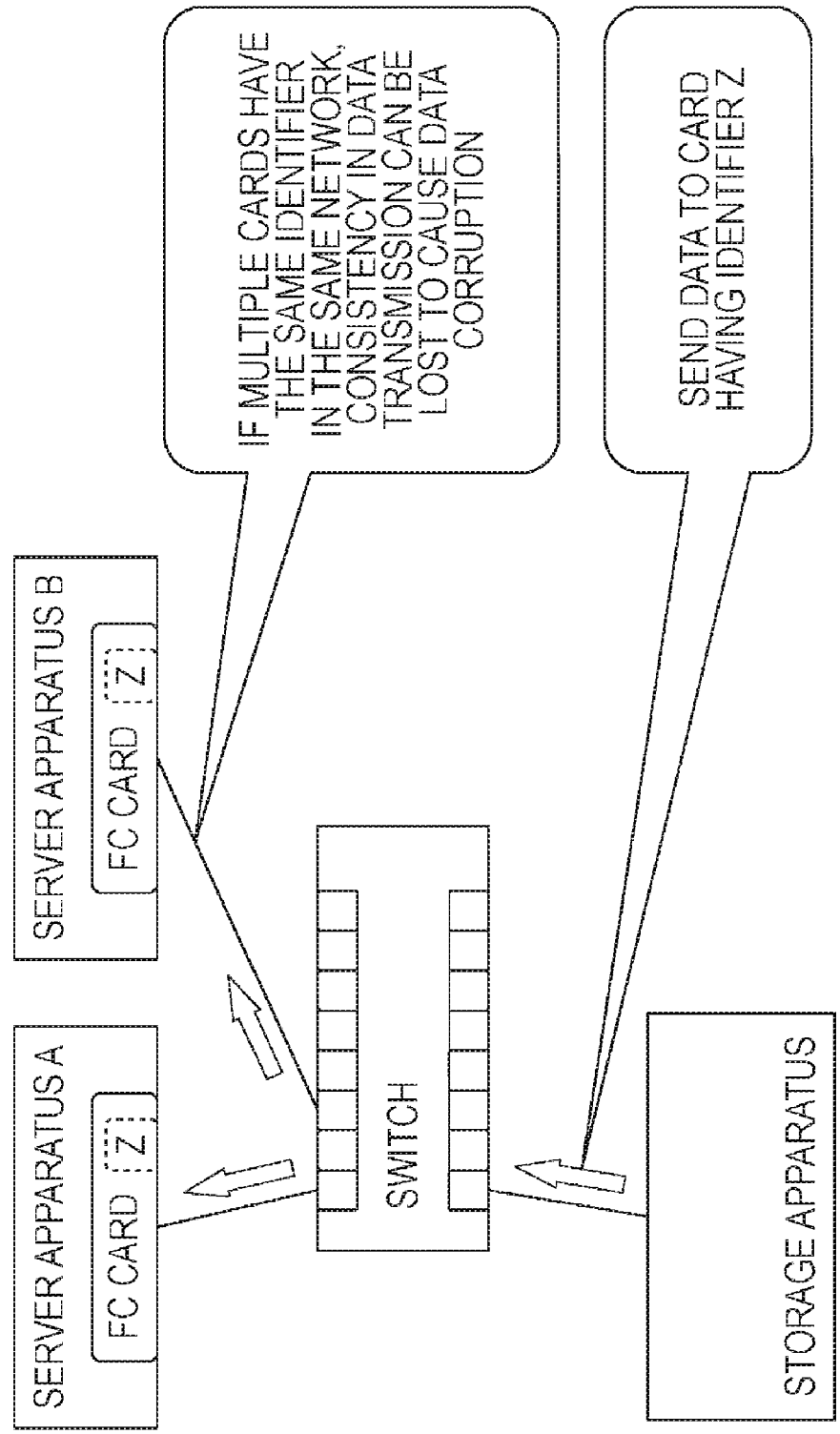

INFORMATION PROCESSING APPARATUS AND PROGRAM AND METHOD FOR SETTING IDENTIFICATION INFORMATION

CROSS-REFERENCE TO RELATED APPLICATION

This application is based upon and claims the benefit of priority of the prior Japanese Patent Application No. 2009-52974, filed on Mar. 6, 2009, the entire content of which is incorporated herein by reference.

FIELD

Embodiments discussed herein relate to information processing apparatuses capable of setting identification information.

BACKGROUND

A key to large-scale computer systems is to have a function of dynamically maintaining the systems in a non-stop state, which is called dynamic reconfiguration. It is also desirable that communication interface cards, such as option cards, and other components mounted in server systems be capable of dynamic maintenance with Peripheral Component Interconnect (PCI) Hot Plug.

The PCI Hot Plug technology enables dynamic replacement of the option cards mounted in the server systems. Individual identifiers, such as World Wide Names (WWNs) or Serial Attached Small Computer System Interface (SCSI) (SAS) addresses, set for replaced option cards are used as identification information for identifying the option cards in communication.

If the option card mounted in a server apparatus is replaced with another one during system operation when another apparatus uses such an identifier as a setting for access authentication for example, it is necessary to change the setting in the other apparatus. FIG. 20A illustrates an example of how a fibre channel (FC) card provided in a server apparatus is replaced in a system including the server apparatus, a switch, and a storage apparatus. The replacement of the FC card provided in the server apparatus causes the identifier corresponding to the FC card to be replaced.

Since the identifier corresponding to the FC card is also replaced in response to the replacement of the FC card, it is necessary to change security settings set by using the identifier specific to the FC card also in the switch and the storage apparatus. In addition, if a system including apparatuses that do not support the dynamic change of the settings is built by multiple vendors, the multiple vendors can be involved in the maintenance of the system to increase the problems concerning the maintenance.

In contrast, there are apparatuses capable of retaining the identifiers specific to cards from before replacement of the cards to after the replacement. Such an apparatus will now be described with reference to FIG. 20B. In a server apparatus in FIG. 20B, since the identifier specific to the FC card provided in the server apparatus is retained from before replacement of the FC card to after the replacement, it is not necessary to change zone settings in the switch. It is also not necessary to change security settings in the storage apparatus.

For example, such a technology is disclosed in Japanese Unexamined Patent Application Publication No. 2002-300736.

SUMMARY

According to an aspect of the invention, an information processing apparatus communicates within a system by using identification information for identifying a device includes, a first device in which a first identifier is uniquely set, a holding part that holds a second identifier settable arbitrarily for a device in the system, an acquiring part that acquires identification information corresponding to a second device connected in the system and is different from the first device, a determining part that determines whether the second identifier to be set for the first device is used in the system as the identification information based on the identification information corresponding to the second device acquired by the acquiring part and the second identifier held in the holding part, and a setting part that sets the second identifier as the identification information of the first device based on the determination by that the second identifier is not used in the system.

It is to be understood that both the foregoing summary description and the following detailed description are exemplary and explanatory and are not restrictive of the invention, as claimed.

BRIEF DESCRIPTION OF DRAWINGS

FIG. 1 is a block diagram illustrating a server apparatus according to an embodiment of the present invention;

FIG. 4 illustrates a card information according to an embodiment;

FIG. 7 illustrates a card information used in the first embodiment;

FIGS. 8A and 8B illustrate sequences to acquire a list of specific identifiers in the first example;

FIGS. 9A and 9B illustrate formats of ADISC request and reply frames used in the first example;

FIGS. 10A and 10B illustrate formats of PLOGI request and reply frames used in the first example;

FIG. 11 illustrates a specific identifier information list acquired in the first example;

FIG. 13 illustrates card information used in the second example;

FIGS. 15A and 15B illustrate formats of FLOGI request and reply frames used in the second example;

FIGS. 16A and 16B illustrate formats of PLOGI request and reply frames used in the second example;

FIGS. 17A and 17B illustrate formats of GPN_PT request and reply frames used in the second example;

FIG. 18 illustrates a specific identifier information list acquired in the second example;

FIG. 21 illustrates a problem in the replacement of an FC card.

DESCRIPTION OF EMBODIMENTS

Figure 2A:
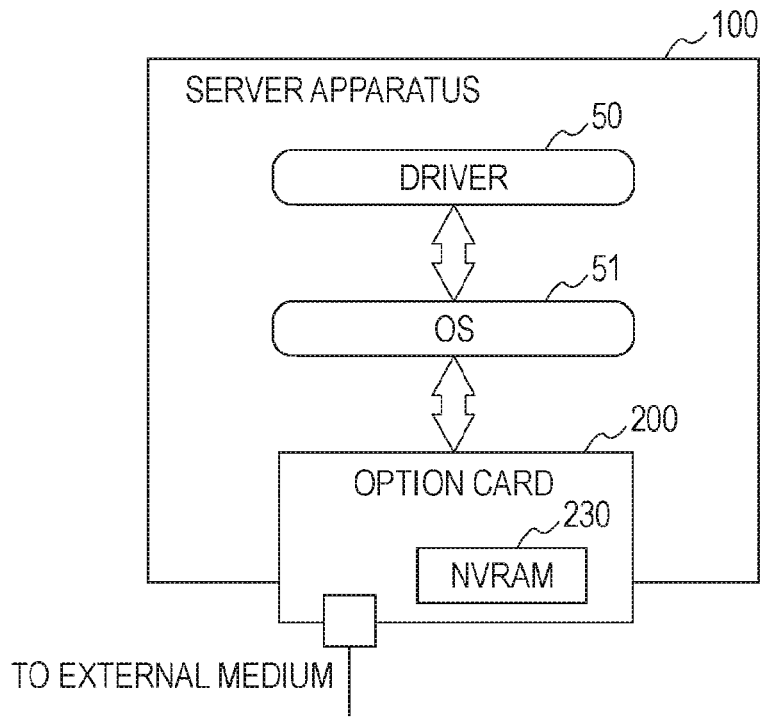
FIG. 2A is a block diagram illustrating a software configuration of the server apparatus according to an embodiment.

Although the problems concerning the maintenance are resolved when the identifier specific to a card is retained from before replacement of the card to after the replacement, the following problems are caused.

If multiple apparatuses having the same identifier are connected in the same system, serious problems such as malfunction, disabled communication, and/or data corruption can be caused. If an identifier is redundantly set in the same system, there is no means for detecting the wrong settings.

FIG. 21 illustrates an example of a problem that can be caused by a card-specific identifier that is redundantly set. In the example in FIG. 21, it is assumed that, when an FC card that is provided in a server apparatus A and that has an identifier Z is replaced, the identifier Z of the replaced FC card is retained by the server apparatus A. It is also assumed that, when a server apparatus B is later added in the same system, the FC card having the identifier Z is erroneously mounted in the server apparatus B.

In the above case, multiple FC cards having the same identifier Z are connected in the same network and, thus, the consistency in data transmission may be lost to cause data corruption. The storage apparatus in the system does not know to which server data is to be sent, the server apparatus A or the server apparatus B, in the transmission of the data to the FC card having the identifier Z.

In order to resolve the above problems, it is an object of the present invention to provide an information processing apparatus capable of retaining the identifier of a card before replacement of the card to after the replacement once there is confirmation of whether the identifier is usable.

In server apparatuses according to various embodiments of the present invention described below, the identifier of an option card is not inherited to another option card with which the option card is replaced in order to avoid a situation in which multiple option cards having the same identifier exist in a range allowing communication in the same network. This is adopted to prevent data corruption or an occurrence of an erroneous operation or to recover from an operation mistake. In addition, if an option card is removed from the current network to be installed in another environment, the identifier specific to the option card is used in the other environment to prevent an occurrence of a failure caused by identifiers that are redundantly set for the option card.

FIG. 1 is a block diagram illustrating an example of a server apparatus according to an embodiment of the present invention. Referring to FIG. 1, a server apparatus 100 (an example of "information processing apparatus") includes a communication control unit 300 and an option card 200. The option card 200 is an example of a first device.

The option card 200 is an interface card communicating with one or more external apparatuses in a network system (hereinafter referred to as a "system") in which multiple apparatuses may communicate with each other. The external apparatus is an example of a second device.

The option card 200 includes a non-volatile random access memory (NVRAM) 230. The NVRAM 230 holds an identifier (hereinafter referred to as a "card specific identifier (original)") that is uniquely set to the option card 200 during manufacturing of the product. The NVRAM 230 also holds an identifier (hereinafter referred to as a "card specific identifier (new)") which a user may appropriately set. The card specific identifier (original) is an example of a first identifier, and the card specific identifier (new) is an example of a second identifier.

The NVRAM 230 further holds a server specific identifier $\alpha$ and a card mounting position information $\beta$. The server specific identifier $\alpha$ is specific to each server apparatus in the system, that is, identifies the server apparatus in which the option card 200 is mounted. The card mounting position information $\beta$ indicates the position where the card is mounted in the server apparatus. In addition, the NVRAM 230 has firmware and boot codes stored therein in advance, with which a boot operation may be performed before a driver 50 described below operates. The option card 200 is, for example, a network card, an FC card, or a SAS card. The card specific identifier (original), the card specific identifier (new), the server specific identifier $\alpha$, and the card mounting position information $\beta$ will be collectively described below.

The communication control unit 300 controls communication using the option card 200 in the system. The communication control unit 300 performs the communication by using the card specific identifier (new) when a given flag is set to "one" in the option card 200, and performs the communication by using the card specific identifier (original) when the card specific identifier (new) is not set.

The communication control unit 300 includes an arrangement change determining part 1, an identification information acquiring part 2, an identification information determining part 3, an identifier setting part 4, and a card information holding part 10. The identifier setting part 4 is an example of an identifier setting part.

The card information holding part 10 holds or stores the card specific identifier (original), the card specific identifier (new), the server specific identifier $\alpha$, and the card mounting position information $\beta$ of the option card 200 mounted in the server apparatus 100.

The arrangement change determining part 1 determines whether the arrangement of the option card 200 is changed in the system based on the server specific identifier $\alpha$ and the card mounting position information $\beta$ set for the option card 200. The identification information acquiring part 2 acquires the respective identifiers from the other apparatuses connected in the system by using the card specific identifier (original), if the arrangement change determining part 1 determines that the arrangement of the option card 200 is not changed in the system. The identifiers acquired from the other apparatuses are listed in a specific identifier information list.

The identification information determining part 3 determines whether or not the card specific identifier (new) held in the card information holding part 10 or the NVRAM 230 is included in the acquired specific identifier information list, to determine whether a card specific identifier coinciding with the card specific identifier (new) to be set is used in the system as information for identifying any of the option cards.

The identifier setting part 4 sets the card specific identifier (new) as identification information of the option card 200 in the system if the identification information determining part 3 determines that the card specific identifier (new) to be set is not used in the system.

The identifier setting part 4 temporarily sets the card specific identifier (original) as the identification information of the option card 200 in the system if the arrangement change determining part 1 determines that the arrangement of the option card 200 is changed in the system.

Figure 2B:
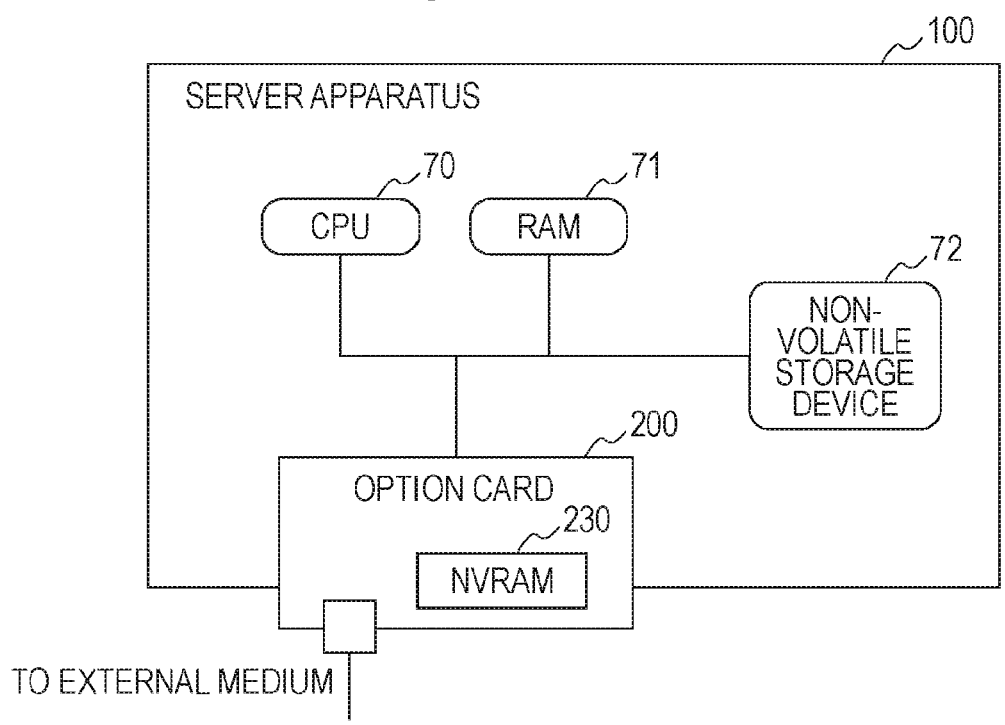
FIG. 2B is a block diagram illustrating a hardware configuration of the server apparatus according to an embodiment.

FIG. 2A is a block diagram illustrating an example of the software configuration of the server apparatus 100, and FIG. 2B is a block diagram illustrating an example of the hardware configuration thereof. The above functional blocks are realized with the software configuration and the hardware configuration illustrated in FIGS. 2A and 2B.

The software configuration of the server apparatus 100 will now be described with reference to FIG. 2A. Referring to FIG. 2A, the server apparatus 100 includes the driver 50 and an operating system (OS) 51. The driver 50 controls the option card 200 via an interface provided by the OS 51. The OS 51 provides the interface via which the driver 50 accesses the option card 200.

The hardware configuration of the server apparatus 100 will now be described with reference to FIG. 2B. Referring to FIG. 2B, the server apparatus 100 includes a central processing unit (CPU) 70 and a random access memory (RAM) 71 serving as a main storage device. The server apparatus 100 also includes a non-volatile storage device 72, such as an internal magnetic disk device or a flash memory. The data stored in the non-volatile storage device 72 is not deleted even if the server apparatus 100 is turned off.

The functional blocks illustrated in FIG. 1 are realized by extracting the driver 50 stored in the non-volatile storage device 72 in the RAM 71 and performing the extracted driver 50 by the CPU 70.

Figure 3:
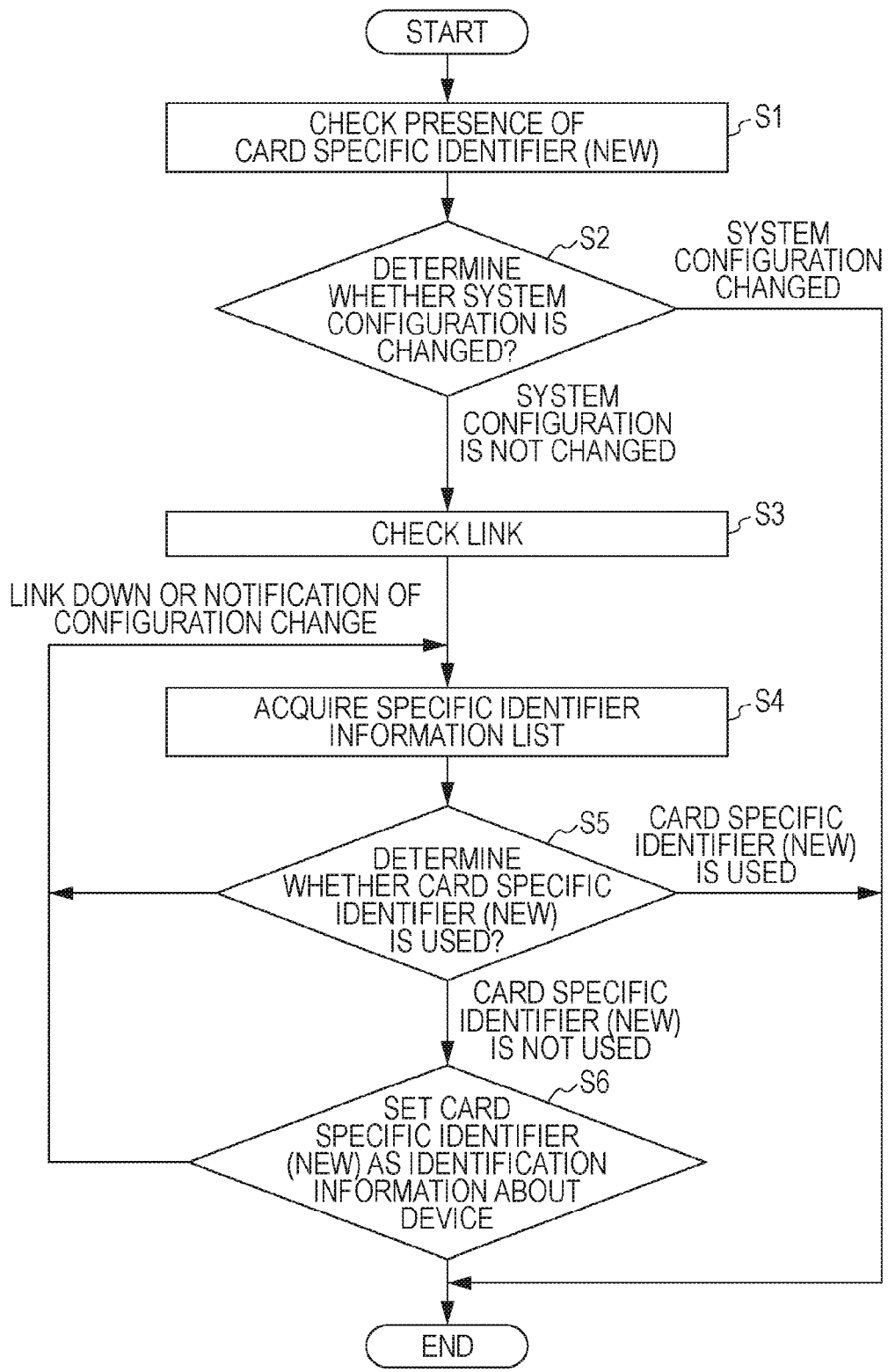
FIG. 3 is a flowchart illustrating an operational process in the server apparatus according to an embodiment.

FIG. 3 is a flowchart illustrating an example of an operational process in the server apparatus 100.

Referring to FIG. 3, in S1, the arrangement change determining part 1 checks whether or not a card specific identifier coinciding with the card specific identifier (new) to be set has already been set in card information stored in the NVRAM 230 or the card information holding part 10 when initializing the firmware and the driver. FIG. 4 illustrates an example of the card information used in the option card 200. S1 may be performed when the OS 51 is booted, or when the option card 200 is turned on in dynamic addition of the option card 200, instead of in the initialization of the firmware and the driver.

Each item in the card information illustrated in FIG. 4 will now be described. A card specific identifier (original) is a specific identifier uniquely given to the option card 200 in manufacturing of the option card 200. The card specific identifier (original) is used as information for identifying the interface. The card specific identifier (original) is set for the option card 200 without exception.

A card specific identifier (new) is a specific identifier given to the option card 200 in response to a setting made by the user. The card specific identifier (new) may be unset in, for example, initial mounting of the option card 200.

A server specific identifier α indicates server-specific information given to the server apparatus 100 itself in which the option card 200 is mounted. The server specific identifier α may be unset in the initial mounting of the option card 200 for example.

A card mounting position information β indicates the position of a mounting slot of the server apparatus 100 in which the option card 200 is mounted. The card mounting position information β may be unset in the initial mounting of the option card 200 for example.

Referring back to FIG. 3, in S2, the arrangement change determining part 1 checks the server specific identifier α and the card mounting position information β in the card information if a card specific identifier coinciding with the card specific identifier (new) to be set has already been set in the card information. Specifically, the arrangement change determining part 1 compares the checked server specific identifier α and card mounting position information β with the current information about the server apparatus 100 stored in the non-volatile storage device 72 to determine whether the system configuration is changed.

If the comparison indicates that the server specific identifier α is changed or the card mounting position information β is changed, the arrangement change determining part 1 recognizes that the system configuration such as the arrangement of the option card is changed. If the arrangement change determining part 1 detects that the system configuration is changed, the identifier setting part 4 clears the information about the card specific identifier (new) that has already been set in the card information to disable the card specific identifier (new), and sets the card specific identifier (new) so as not to be checked at the next startup. In this case, the card specific identifier (original) is used as the specific information for identifying an interface. Then, the operational process in FIG. 3 is terminated.

If the card specific identifier (new) has already been set in the card information and the system configuration is not changed, the process proceeds to S3. However, if the card specific identifier (new) has not been set in the card information and the card specific identifier (new) is to be set, the card specific identifier (new) is set by the user as the card information in S2 and, then, the process proceeds to S3.

In S3, the state of link is checked. If the transmission line is linked up or if a notification of the change of the system configuration is received in the state in which the transmission line is linked up, the process proceeds to S4.

In S4, the identification information acquiring part 2 uses the card specific identifier (original) of each apparatus connected in the system to acquire the identification information about each such apparatus. Although the identification information is acquired in a list format, that is, as the specific identifier information list, the identification information about each apparatus may be acquired and the acquired identification information may be listed by the identification information acquiring part 2. How the identification information is acquired will be described in detail below.

If the transmission line is linked down during S4 or if a notification of the change of the system configuration is received in the state in which the transmission line is linked up, S4 is performed again.

In S5, the identification information determining part 3 searches the acquired specific identifier information list for the value of the card specific identifier (new) to be set to determine whether or not the card specific identifier (new) to be set is used in the system. If the card specific identifier (new) to be set is used in the system, the identification information determining part 3 sends a message to the user. The identifier setting part 4 clears the information about the card specific identifier (new) that has already been set to disable the card specific identifier (new), and sets the card specific identifier (new) so as not to be checked at the next startup. In this case, the card specific identifier (original) is used as the specific information for identifying an interface. Then, the operational process in FIG. 3 is terminated.

If the card specific identifier (new) to be set is not used in the system, the process proceeds to S6.

When the card specific identifier (new) to be set is used, for example, a message "The set card specific identifier (new) "X" is disabled because the card specific identifier (new)) is used by another card in the system. The card specific identifier (original) "'Y' is used." is then used in the above example.

If the transmission line is linked down during S5, or if a notification of the change of the system configuration is received in the state in which the transmission line is linked up, the process goes back to S4.

If it is confirmed that no interface using the card specific identifier (new) to be set exists in the same system, the identifier setting part 4 sets the card specific identifier (new) as the specific information for identifying the option card 200 in S6. This enables communication by using the set card specific identifier (new). In association with this, the identifier setting part 4 sets a predetermined flag to "one" in the option card 200 for which the card specific identifier (new) is set. The communication control unit 300 performs the communication using the card specific identifier (new) while the predetermined flag is set to "one".

If the server specific identifier α and the card mounting position information β are not set in the card information (that is, in an initial state), the server specific identifier α and the card mounting position information β for the server in which the option card 200 is mounted are set in S6.

If the transmission line is linked down during S6 or if a notification of the change of the system configuration is received in the state in which the transmission line is linked up, the process goes back to S4.

Figure 5:
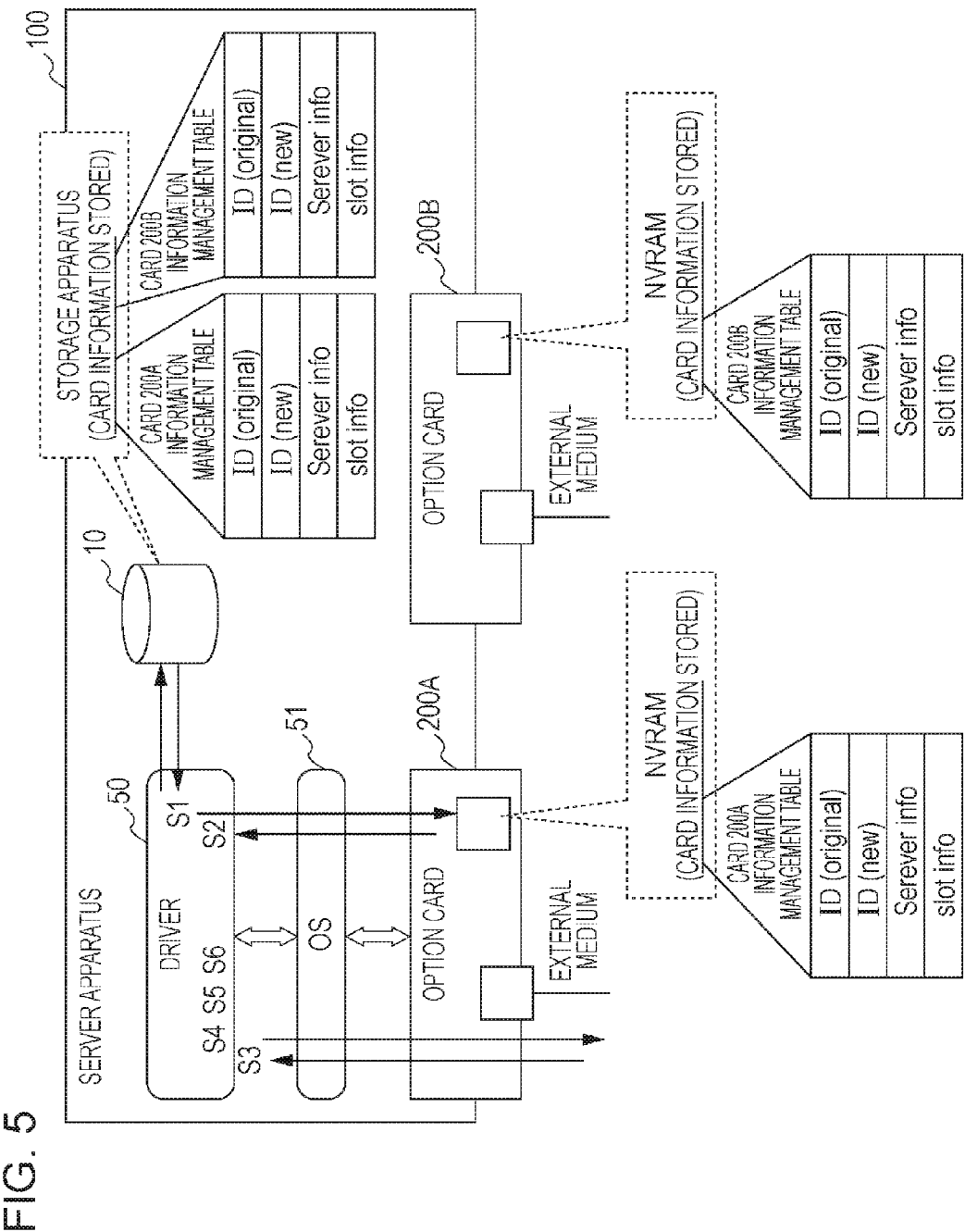
FIG. 5 illustrates a server apparatus according to an embodiment that includes multiple option cards.

As illustrated in FIG. 5, even when multiple option cards 200A and 200B exist in the server apparatus 100, a process similar to the one illustrated in FIG. 3 is performed. Although various operations shown in FIG. 3 are illustrated in the driver 50 in FIG. 5 to indicate that the driver 50 performs such operations in cooperation with the hardware illustrated in FIG. 2B, these operations may be performed by the firmware in the option cards 200A and 200B.

Examples of embodiments of the present invention will herein be described.

First Example

Figure 6:
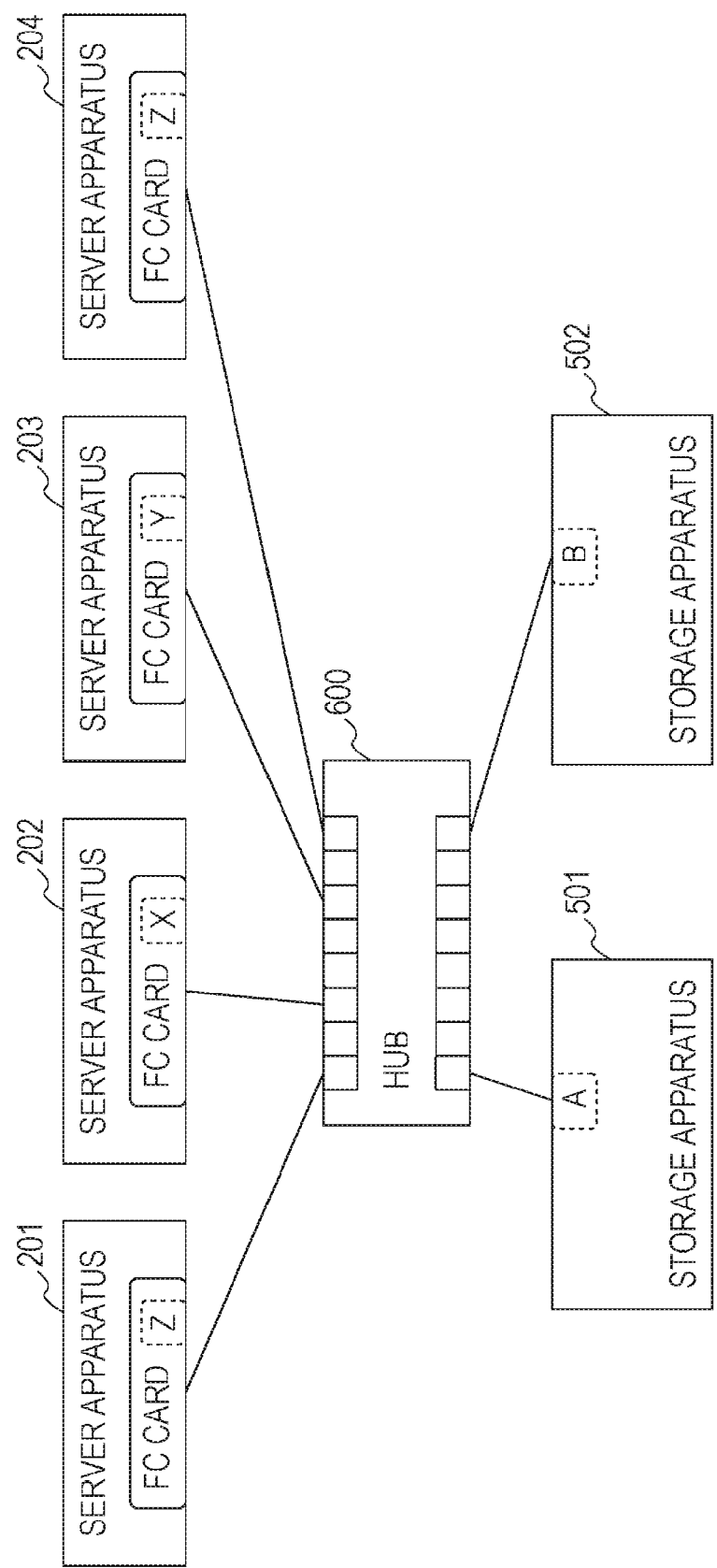
FIG. 6 is a block diagram illustrating a configuration of a system according to a first example of an embodiment of the present invention.

How the WWN is retained when FC cards are connected by Fibre Channel Arbitrated Loop (FC_AL) will now be described as a first example of an embodiment of the present invention. FIG. 6 is a block diagram illustrating an example of the configuration of a system according to the first example. Referring to FIG. 6, the system of the first example has a configuration in which four server apparatuses 201, 202, 203, and 204 each including an FC card and two storage apparatuses 501 and 502 are connected to each other via a hub 600. The server apparatuses 201, 202, 203, and 204 each include the arrangement change determining part 1, the identification information acquiring part 2, the identification information determining part 3, the identifier setting part 4, and the card information holding part 10. Reference numeral "A", "B", "X", "Y", and "Z" in FIG. 6 denote the identifiers corresponding to the apparatuses.

A case is described with reference to FIG. 6, in which the card specific identifier of an FC card is erroneously set to the identifier coinciding with that of another card existing in the system. For example, it is assumed that the identifier "Z" coinciding with the identifier "Z" set for the FC card mounted in the server apparatus 204 is set for the FC card mounted in the server apparatus 201. An example of the operational process in the server apparatus of the first example will now be described.

(1-1) The arrangement change determining part 1 checks whether or not a card specific identifier coinciding with the card specific identifier (new) to be set has already been set in the card information stored in the NVRAM 230 in the card or the card information holding part 10 when initializing the system. FIG. 7 illustrates an example of the card information used in the first example. In the example in FIG. 7, World Wide Port Names (WWPNs) are used as the card specific identifiers (original). An identifier having a format conforming to the WWPN is used as the card specific identifier (new). A media access control (MAC) address of the server apparatus is used as the server specific identifier α. A physical device name is used as the card mounting position information β. The server specific identifier α and the card mounting position information β are unset when a new card is mounted.

(1-2) If a card specific identifier coinciding with the card specific identifier (new) to be set has already been set in the card information, the arrangement change determining part 1 checks the server specific identifier α and the card mounting position information β to compare the checked server specific identifier α and card mounting position information β with the current information about the server apparatus. It is assumed in the first example that the card specific identifier (new) is newly set.

(1-3) If the checked state of link indicates that the transmission line is linked up, the process proceeds to the next step.

(1-4) The identification information acquiring part 2 uses the card specific identifier (original) to acquire a list of identifiers specific to the apparatuses connected in the system (the specific identifier information list). If the transmission line is linked down during this operation, the operation is performed again from the beginning.

FIGS. 8A and 8B illustrate examples of sequences to acquire a list of the specific identifiers. FIGS. 9A and 9B and FIGS. 10A and 10B illustrate examples of the formats of request and reply frames used in the first example. Big endian is used for the request and reply frames. In the FC_AL environment, Address Discover (ADISC) Extended Link Services (ELSs) are sent to up to 126 apparatuses that possibly exist in the loop.

The WWPN information about an apparatus that has normally returned a reply frame (ELS_ACC) in response to the ADISC request may be acquired. FIG. 8A illustrates an example of a sequence when a reply frame is normally returned. FIG. 9A illustrates an example of the format of an ADISC request frame sent from the server apparatus 201. FIG. 9B illustrates an example of the format of an ADISC reply frame in response to the sent request frame. Since whether or not the card specific identifier (new) may be used in the communication in this state is unknown, the card specific identifier (original) is used for the request frame (refer to FIG. 9A).

As for an apparatus that has returned a timeout or a rejection in response to the ADISC request, the identification information acquiring part 2 performs login processing by sending port login (PLOGI) and, then, acquires information about the connected apparatus. If the information about the connected apparatus may be normally acquired, the identification information acquiring part 2 sends a LOGO to the connected apparatus. If the PLOGI is not normally terminated, the identification information acquiring part 2 stops the acquisition of the information about the apparatus. FIG. 8B illustrates an example of a sequence when a timeout or a rejection is returned. FIG. 10A illustrates an example of the format of a PLOGI request frame sent from the server apparatus. FIG. 10B illustrates an example of the formant of a PLOGI reply frame in response to the request frame.

FIG. 11 illustrates an example of the acquired specific identifier information list. As illustrated in example in FIG. 11, port identifiers (IDs) of the ports of the hub 600 illustrated in FIG. 6 are held in the specific identifier information list in association with specific identifier information (WWPN) about the apparatuses connected to the ports. The specific identifier information on the port to which no apparatus is connected is not registered in the specific identifier information list.

(1-5) The identification information determining part 3 searches the acquired specific identifier information list (the specific identifier information for up to 126 apparatuses) for a card specific identifier coinciding with the card specific identifier (new) to be set to determine whether the card specific identifier (new) to be set is used in the system. If the card specific identifier (new) to be set is used in the system, the identification information determining part 3 sends a message to the user. The identifier setting part 4 clears the information about the card specific identifier (new) to disable the card specific identifier (new). In this case, the card specific identifier (original) is used as the specific information for identifying an interface. Then, the operational process is terminated. If the card specific identifier (new) to be set is not used in the system, the process proceeds to (1-6). If the transmission line is linked down during (1-5), the process goes back to (1-4).

(1-6) If it is confirmed that no interface using the card specific identifier (new) to be set exists in the same system, the identifier setting part 4 sets the card specific identifier (new) as the specific information for identifying the card. This enables communication by using the card specific identifier (new). If the server specific identifier α and the card mounting position information β are not set in the initial mounting of the card for example, the server specific identifier α and the card mounting position information β are set in (1-6).

Second Example

How the WWN is retained when FC cards are connected via a switch will now be described as a second example of an embodiment of the present invention.

Figure 12:
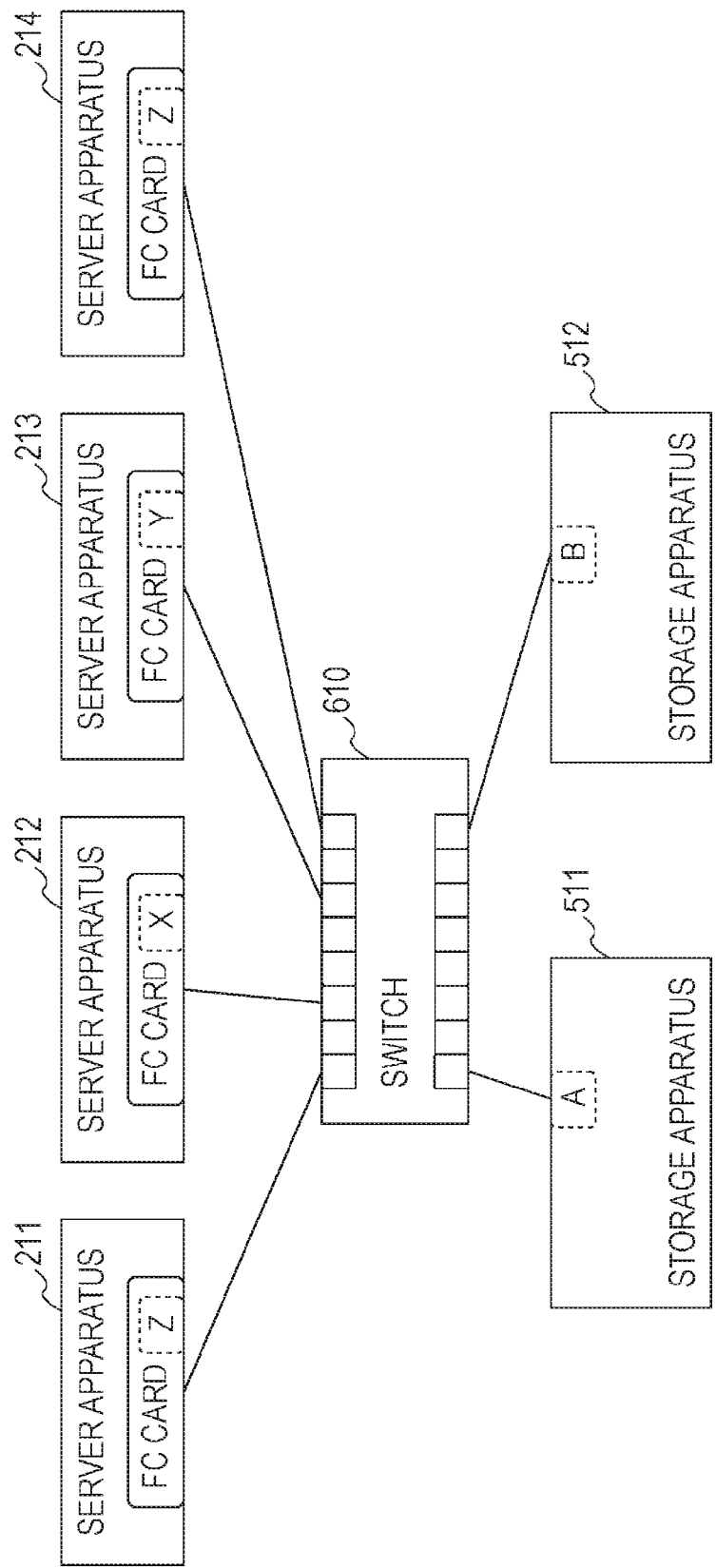
FIG. 12 is a block diagram illustrating a configuration of a system according to a second example of an embodiment of the present invention.

FIG. 12 is a block diagram illustrating a second example of the configuration of a system according to an embodiment. This system has a configuration in which four server apparatuses 211, 212, 213, and 214 each including an FC card and two storage apparatuses 511 and 512 are connected to each other via a switch 610. The server apparatuses 211, 212, 213, and 214 each include the arrangement change determining part 1, the identification information acquiring part 2, the identification information determining part 3, the identifier setting part 4 and the card information holding part 10. Reference numeral "A", "B", "X", "Y" and "Z" in FIG. 12 denote the identifiers corresponding to the apparatuses.

In the second embodiment, as in the first embodiment, a case is described with reference to FIG. 12, in which the card specific identifier of an FC card is erroneously set to the identifier coinciding with that of another card existing in the system. For example, it is assumed that the identifier "Z" coinciding with the identifier "Z" set for the FC card mounted in the server apparatus 214 is set for the FC card mounted in the server apparatus 211. An operational process in the server apparatus of the second example will now be described.

(2-1) The arrangement change determining part 1 checks whether or not the card specific identifier (new) "Z" to be set has already been set in the card information stored in the NVRAM 230 in the card or the card information holding part 10 when initializing the system. FIG. 13 illustrates an example of the card information used in the second example. In the example in FIG. 13, WWNs are used as the card specific identifiers (original). An identifier having a format conforming to the WWN is used as the card specific identifier (new). A MAC address of the server apparatus is used as the server specific identifier α. A physical device name is used as the card mounting position information β. The server specific identifier α and the card mounting position information β are unset when a new card is mounted.

(2-2) If the card specific identifier (new) "Z" to be set has already been set in the system, the arrangement change determining part 1 checks the server specific identifier α and the card mounting position information β to compare the checked server specific identifier α and card mounting position information β with the current information about the server apparatus. In this case, the comparison is not performed because it is assumed in the second example that a card specific identifier (new) is newly set.

(2-3) If the checked state of link indicates that the transmission line is linked up or if a notification of the change of the system configuration is received in the state in which the transmission line is linked up, the process proceeds to the next operation.

(2-4) The identification information acquiring part 2 uses the card specific identifier (original) to acquire a list of identifiers specific to the apparatuses connected in the system (the specific identifier information list). In the fibre channel environment using the switch connection, the identification information acquiring part 2 sends an inquiry to the switch 610 managing the information about the connected apparatuses. If a reply is normally returned, the identification information acquiring part 2 acquires the identification information used by the connected apparatus. If the transmission line is linked down during this operation or if a notification of the change of the system configuration is received in the state in which the transmission line is linked up, the process goes back to (2-4).

Figure 14:
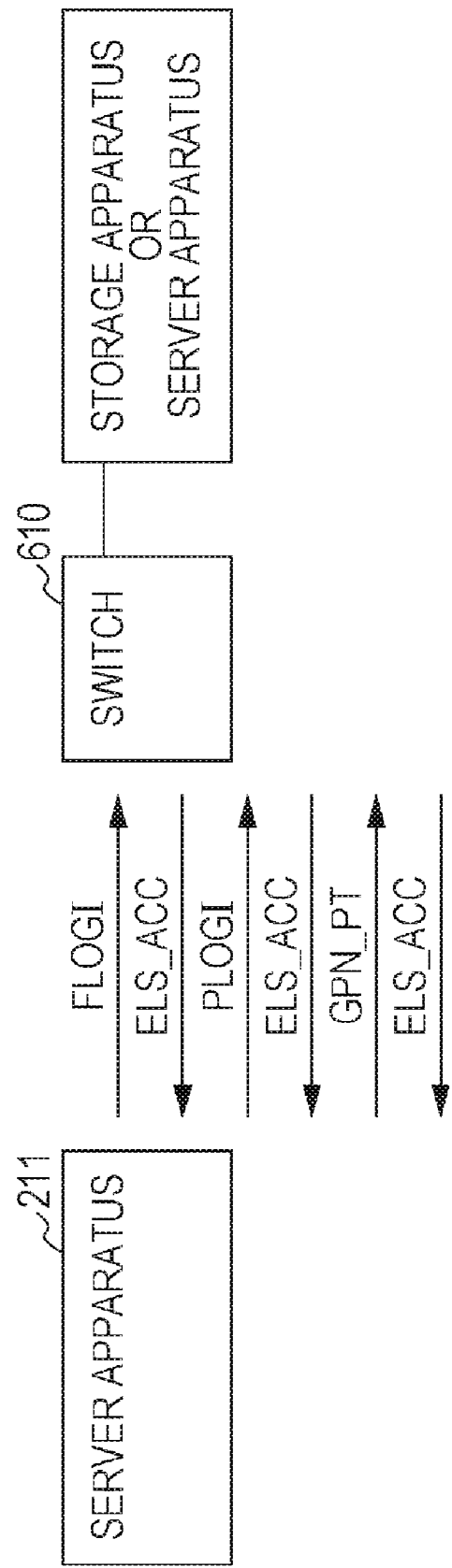
FIG. 14 illustrates a sequence to acquire a list of specific identifiers in the second example.

FIG. 14 illustrates an example of a sequence to acquire a list of the specific identifiers. The following operations are performed in the acquisition of the list of the specific identifiers in the second example.

The server apparatus 211 logs in to the switch 610 (FLOGI).

The server apparatus 211 logs in to a name server existing in the switch 610 (PLOGI).

The server apparatus 211 sends an inquiry to the name server about the connected apparatus (GPN_PT).

If the switch 610 sends a timeout or a rejection in response to the FLOGI and the GPN_PT, the operations mentioned above are performed again. If a reply is normally returned from the switch 610 in response to the FLOGI and the GPN_PT (ELS_ACC), the server apparatus 211 acquires the specific identifier information about the connected apparatus.

FIG. 15A, FIG. 15B, FIG. 16A, FIG. 16B, FIG. 17A and FIG. 17B illustrate examples of the formats of request and reply frames according to the second example. FIG. 18 illustrates an example of the acquired specific identifier information list.

FIG. 15A illustrates an example of the format of an FLOGI request frame sent from the server apparatus 211 to the switch 610. FIG. 15B illustrates an example of the format of an FLOGI reply frame received by the server apparatus 211 from the switch 610.

FIG. 16A illustrates an example of the format of a PLOGI request frame sent from the server apparatus 211 to the switch 610. FIG. 16B illustrates an example of the format of a PLOGI reply frame received by the server apparatus 211 from the switch 610.

FIG. 17A illustrates an example of the format of a GPN_PT request frame sent from the server apparatus 211 to the switch 610. FIG. 17B illustrates an example of the format of a GPN_PT reply frame received by the server apparatus 211 from the switch 610.

If an access to the card having the card specific identifier (new) in the system is limited, the following operations are performed. However, if access limitation such as zone settings is not placed in the switch 610, it is not necessary to perform the following operations.

(2-4-1) The identification information acquiring part 2 causes a link-down state to disconnect from the switch 610.

(2-4-2) The identification information acquiring part 2 changes the specific identifier information set for the FLOG from the information about the card specific identifier (original) to the information about the card specific identifier (new) and sends an FLOGI request frame.

(2-4-3) The identification information acquiring part 2 logs in the name server existing in the switch 610 (PLOGI).

(2-4-4) The identification information acquiring part 2 sends a GPN_PT to the switch 610 to acquire information about the connected apparatus.

If an error occurs during the operations from (2-4-1) to (2-4-4), it is determined that the apparatus using the card specific identifier (new) possibly exists in the system. Accordingly, in this case, the identification information acquiring part 2 sends a message to the user, and the identifier setting part 4 clears the information about the card specific identifier (new) to set the card specific identifier (new) so as not to be checked at the next startup. Then, the operations are terminated.

(2-5) The identification information determining part 3 searches the acquired specific identifier information list for the card specific identifier (new) to determine whether the card specific identifier (new) is used in the system. If the card specific identifier (new) is used in the system, the identification information determining part 3 sends a message to the user. The identifier setting part 4 clears the information about the card specific identifier (new) to set the card specific identifier (new) so as not to be checked at the next startup. In this case, the card specific identifier (original) is used as the specific information for identifying an interface. Then, the operational process in the second example is terminated. If the card specific identifier (new) is not used in the system, the process proceeds to the next operation.

(2-6) Since it is confirmed in (2-5) that no interface using the card specific identifier (new) exists in the same system, the identifier setting part 4 sets the card specific identifier (new) as the specific information for identifying the card. This enables communication by using the card specific identifier (new). If the server specific identifier $\alpha$ and the card mounting position information $\beta$ are not set (in the initial state), the server specific identifier $\alpha$ and the card mounting position information $\beta$ are set in (2-6).

A holding part may correspond to either of the card information holding part 10 and the NVRAM 230 in the above examples and embodiments.

Figure 19:
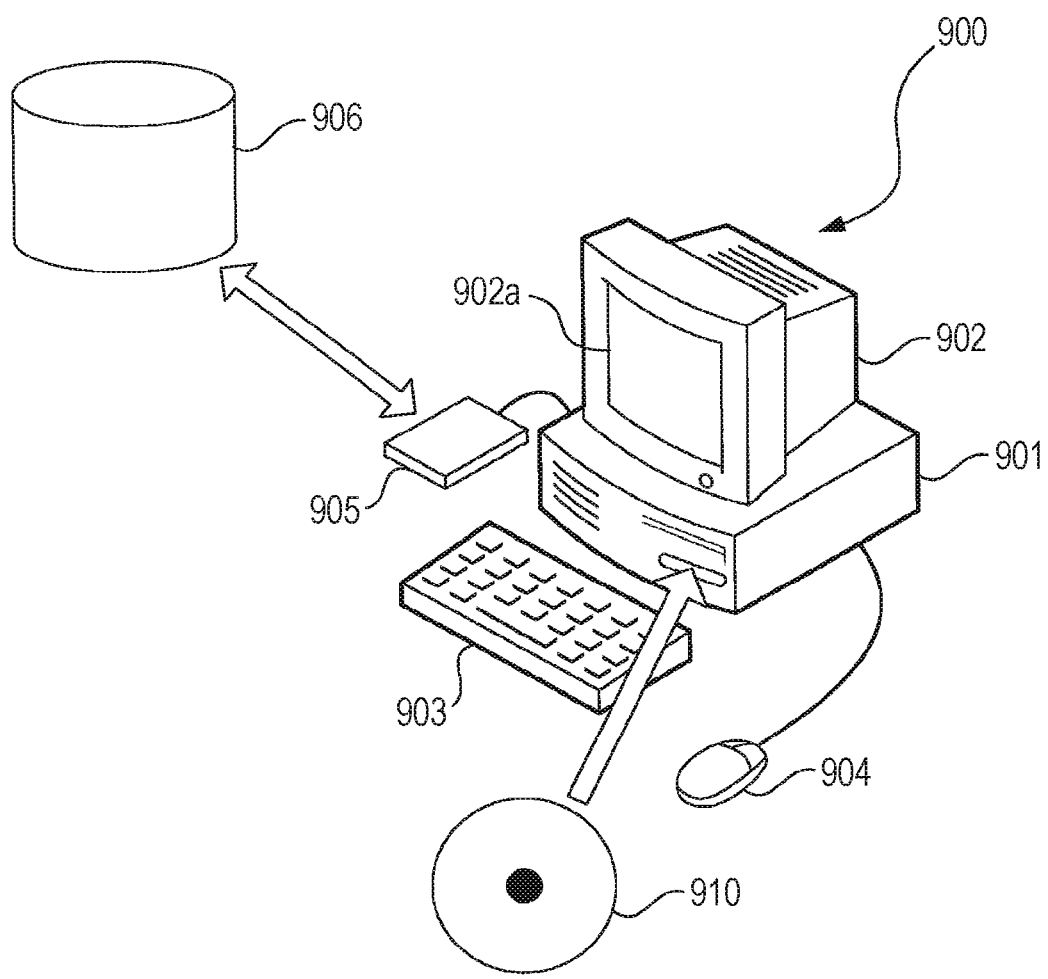
FIG. 19 illustrates a computer system according to an embodiment of the present invention.
Figure 20A:
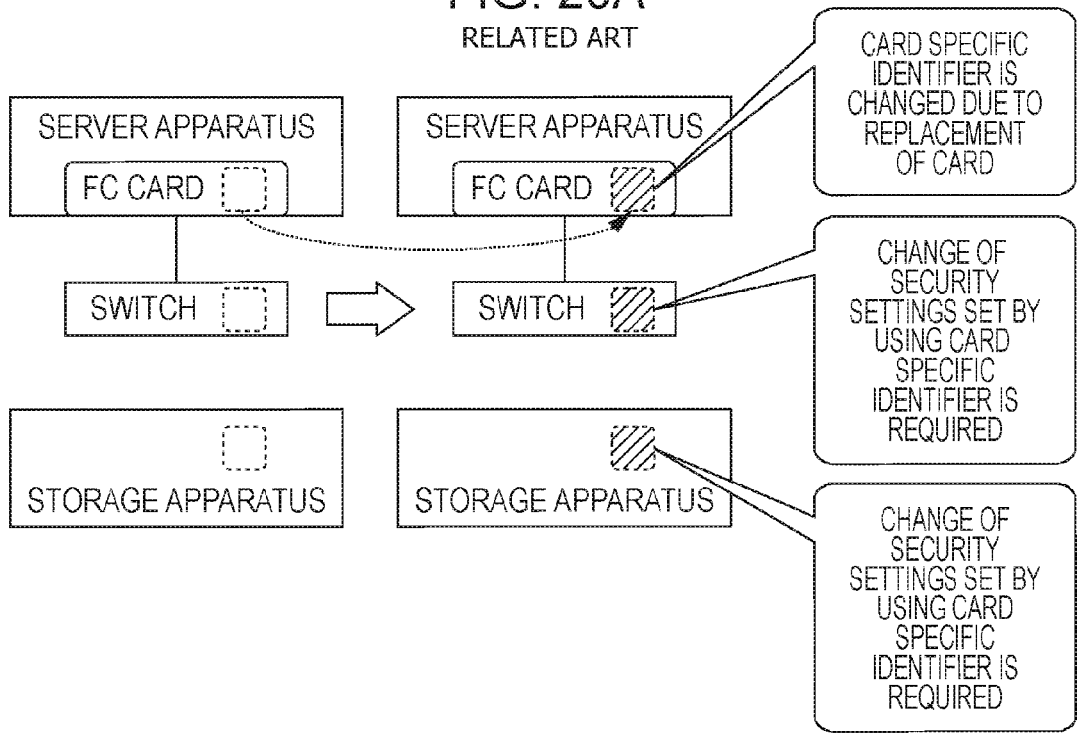
FIGS. 20A and 20B illustrate replacement of an FC card.
Figure 20B:
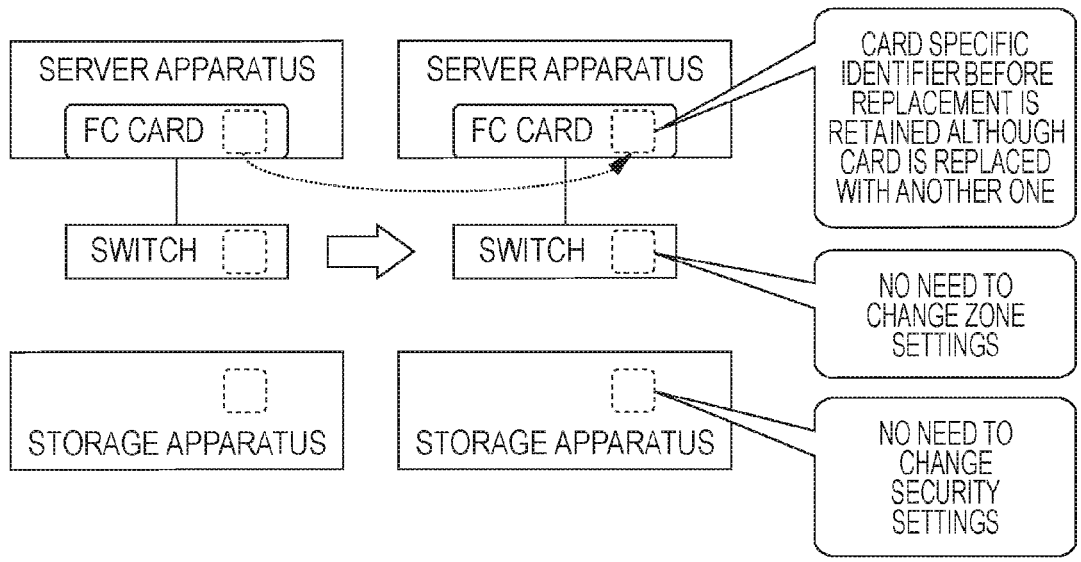

The above examples and embodiments are applicable to a computer system described below. FIG. 19 illustrates an example of a computer system to which the embodiments and examples thereof are applied. Referring to FIG. 19, a computer system 900 includes a main body 901, a display device 902, a keyboard 903, a mouse 904, a communication device 905. The main body 901 includes a CPU, a disk drive, and so on. The display device 902 displays an image in response to an instruction from the main body 901. The keyboard 903 is used by the user to input a variety of information into the computer system 900. The mouse 904 is used by the user to specify an arbitrary position on a display screen 902a of the display device 902. The communication device 905 accesses an external database or the like to download, for example, a program stored in another computer system. For example, a network communication card or a modem is used as the communication device 905.

A program causing the computer system described above, which composes an information processing apparatus, to execute the above operations is provided as an identification information setting program. The program can be stored in a computer-readable recording medium to be executed by the computer system composing an information processing apparatus. The program causing the computer system to execute the above operations is stored in a portable recording medium, such as a disk 910, or is downloaded from a storage medium 906 in another computer system to the computer system 900 through the communication device 905.

The identification information setting program at least providing an identification information setting function to the computer system 900 is input into the computer system 900 to be compiled. The identification information setting program causes the computer system 900 to operate as an information processing system having the identification information setting function.

In addition, the identification information setting program may be stored in a computer-readable recording medium, such as the disk 910. The recording medium from which data may be read by the computer system 900 is, for example, an internal storage device, such as a read only memory (ROM) or a RAM, internally implemented in the computer; a portable recording medium, such as the disk 910, a flexible disk, a digital versatile disk (DVD), a magneto-optical disk, or an integrated circuit (IC) card; a database holding the computer program; another computer system and a database in the other computer system; or another recording medium that may be accessed from a computer system connected via communication equipment, such as the communication device 905.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An information processing apparatus that performs communication within a system by using identification information for identifying a device, the information processing apparatus comprising:

a first device in which a first identifier is uniquely set for the first device;

a holding part that holds a second identifier that is settable arbitrarily for a device provided in the system;

an arrangement change determining part that determines whether an arrangement of the first device within the system is changed;

an identification information acquiring part that acquires identification information corresponding to at least one second device that is connected in the system and that is different from the first device when the arrangement change determining part determines that the arrangement of the first device within the system is not changed;

an identification information determining part that determines whether the second identifier to be set for the first device is used in the system as the identification information based on the identification information corresponding to the at least one second device acquired by the identification information acquiring part and the second identifier held in the holding part; and an identifier setting part that sets the second identifier as the identification information of the first device based on the identification information determining part determining that the second identifier is not used in the system, the identifier setting part setting the first identifier as the identification information of the first device further based on the arrangement change determining part determining that the arrangement of the first device within the system is changed.

2. An information processing apparatus using identification information for identifying a device to perform communication in a system, the information processing apparatus comprising:

a first device having a first identifier uniquely set therefor;

an arrangement change determining part that determines whether the arrangement of the first device within the system is changed;

an identification information acquiring part that acquires identification information set for at least one second device that is connected in the system and that is different from the first device based on the first identifier of the first device when the arrangement change determining part determines that the arrangement of the first device within the system is not changed;

an identification information determining part that determines whether a second identifier that is set for the first device and that is settable arbitrarily is used in the system as the identification information based on the identification information corresponding to the at least one second device acquired by the identification information acquiring part and a content of the second identifier; and an identifier setting part that sets the second identifier as the identification information of the first device when the identification information determining part determines that the second identifier is not used in the system.

3. The information processing apparatus according to claim 2, wherein the identifier setting part clears the identification information that is set for the first device and sets the first identifier as the identification of the first device when it is determined that the second identifier is used as identification information for any of the at least one second device.

4. The information processing apparatus according to claim 2, wherein the first identifier is set as the identification information of the first device based at least on the arrangement change determining part determining that the arrangement of the first device within the system is changed.

5. The information processing apparatus according claim 2, further comprising:

a holding part that holds the second identifier set for the first device provided in the information processing apparatus.

6. The information processing apparatus according to claim 2, further comprising:

a holding part that holds specific information used for identifying the information processing apparatus in which the device is mounted and mounting position information indicating a position where the device is mounted in the information processing apparatus, wherein the arrangement change determining part determines whether the arrangement of the first device is changed in the system based on at least one of the specific information about the information processing apparatus corresponding to the first device and the mounting position information, which are held in the holding part.

7. The information processing apparatus according to claim 2, wherein the identification information acquiring part acquires the identification information set for the at least one second device again when a transmission line between the first device and the second device is linked down while acquiring the identification information of the at least one second device.

8. A computer-readable recording medium holding a program causing a computer to execute a process to set identification information of a device mounted in the computer, the process comprising:

determining whether an arrangement of a first device for which a first identifier that identifies the first device is set is changed in a system;

acquiring the identification information set for at least one second device that is connected in the system and that is different from the first device by using the first identifier upon the determining that the arrangement of the first device within the system is not changed;

determining whether a second identifier that is to be set for the first device and that is settable arbitrarily by a user is used as the identification information of any device in the system based on the second identifier to be set for the first device and the second identifier set for the second device;

setting the second identifier as the identification information of the first device upon the determining that the second identifier is not used in the system, and setting the first identifier as the identification information of the first device when it is determined that the arrangement of the first device within the system is changed.

* * * * *